(12) United States Patent
Yamanaka

(10) Patent No.: US 8,938,162 B2
(45) Date of Patent: Jan. 20, 2015

(54) INTERCHANGEABLE LENS, INTERCHANGEABLE LENS CONTROL METHOD, CAMERA AND CAMERA CONTROL METHOD

(71) Applicant: Canon Kabushiki Kaisha, Tokyo (JP)

(72) Inventor: Tomoaki Yamanaka, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/893,421

(22) Filed: May 14, 2013

(65) Prior Publication Data

US 2013/0308934 A1    Nov. 21, 2013

(30) Foreign Application Priority Data

May 16, 2012    (JP) ................................. 2012-112147

(51) Int. Cl.
*G03B 3/10*      (2006.01)
*G03B 13/34*     (2006.01)
*G02B 7/14*      (2006.01)
*G03B 17/14*     (2006.01)

(52) U.S. Cl.
CPC   *G03B 13/34* (2013.01); *G02B 7/14* (2013.01); *G03B 17/14* (2013.01); *G03B 2206/00* (2013.01)
USPC ...................................................... 396/133

(58) Field of Classification Search
CPC .................................. G03B 3/10; G03B 17/14
USPC ....................................................... 396/133
See application file for complete search history.

(56) References Cited

U.S. PATENT DOCUMENTS

| 5,666,570 | A | 9/1997 | Ohsawa | |
|---|---|---|---|---|
| 8,542,989 | B2 * | 9/2013 | Shibuno et al. | 396/133 |
| 2009/0251548 | A1 | 10/2009 | Honjo et al. | |
| 2009/0284643 | A1 | 11/2009 | Shibuno et al. | |
| 2009/0285572 | A1 * | 11/2009 | Shibuno et al. | 396/133 |
| 2011/0064397 | A1 * | 3/2011 | Shibuno et al. | 396/133 |
| 2011/0069946 | A1 | 3/2011 | Honjo et al. | |
| 2011/0080488 | A1 * | 4/2011 | Okamoto et al. | 348/220.1 |
| 2011/0229118 | A1 | 9/2011 | Imafuji | |
| 2012/0070139 | A1 * | 3/2012 | Shibuno et al. | 396/133 |

(Continued)

FOREIGN PATENT DOCUMENTS

EP    1 976 037 A2    10/2008
JP    2004023476 A    1/2004

(Continued)

OTHER PUBLICATIONS

Partial European Search Report for corresponding EP 13167770.0, dated Sep. 23, 2013.

(Continued)

*Primary Examiner* — Rodney Fuller
(74) *Attorney, Agent, or Firm* — Rossi, Kimms & McDowell LLP

(57) ABSTRACT

The interchangeable lens detachably attachable to a camera includes a lens communicator configured to perform communication with the camera, a motor to move or actuate a driven member included in the interchangeable lens, and a lens controller. The lens controller is configured to perform, in response to receipt, from the camera through the communication, of a drive instruction to drive the motor and a driving power supply instruction to supply a driving electric power to the motor, supply of the driving electric power to the motor.

8 Claims, 6 Drawing Sheets

(56) References Cited

U.S. PATENT DOCUMENTS

2012/0328277 A1* 12/2012 Nakata et al. ............... 396/131
2013/0077952 A1* 3/2013 Sugiyama et al. ............ 396/530

FOREIGN PATENT DOCUMENTS

| JP | 2012-004949 A | 1/2012 |
| WO | 2009048074 A1 | 4/2009 |

OTHER PUBLICATIONS

European Search Report issued in European counterpart application No. EP13167770.0, dated Jan. 16, 2014.

* cited by examiner

US 8,938,162 B2

INTERCHANGEABLE LENS, INTERCHANGEABLE LENS CONTROL METHOD, CAMERA AND CAMERA CONTROL METHOD

BACKGROUND OF THE INVENTION

1. Field of the Invention

The present invention relates to an interchangeable lens and a camera constituting a lens-interchangeable camera system, and particularly to motor energization control in the interchangeable lens.

2. Description of the Related Art

Interchangeable lenses are provided with various driven member such as a focus lens, an aperture stop, zoom (magnification-varying) lens and an image stabilizing (image blur correcting) lens and with motors to move or actuate them. For such interchangeable lenses, reduction of power consumption is required.

For example, Japanese Patent Laid-Open 2012-004949 discloses a lens-interchangeable camera system in which, for sake of reducing power consumption, an interchangeable lens sends information showing presence or absence of an object member to be controlled to a camera, and the camera causes the interchangeable lens to stop its operation depending on the presence or absence of the object member.

In addition to necessity of such reduction of power consumption for the interchangeable lens, silence achieved by suppressing generation of noise when driving a motor provided in the interchangeable lens during video capturing is required. Particularly, as the noise generated from the motor, vibration sound caused by vibration of the motor when drive thereof is started and stopped is required to be reduced.

BRIEF SUMMARY OF THE INVENTION

The present invention provides an interchangeable lens capable of suppressing generation of vibration sound from a motor while reducing power consumption and a camera usable with the interchangeable lens.

The present invention provides as one aspect thereof an interchangeable lens detachably attachable to a camera. The interchangeable lens includes a lens communicator configured to perform communication with the camera, a motor to move or actuate a driven member included in the interchangeable lens, and a lens controller configured to perform, in response to receipt, from the camera through the communication, of a drive instruction to drive the motor and a driving power supply instruction to supply a driving electric power to the motor, supply of the driving electric power to the motor.

The present invention provides as another aspect thereof a camera to which an interchangeable lens is detachably attachable. The camera includes a camera communicator configured to perform communication with the interchangeable lens, and a camera controller. The interchangeable lens includes a lens communicator configured to perform communication with the camera, a motor to move or actuate a driven member included in the interchangeable lens, and a lens controller configured to perform, in response to receipt of a drive instruction to drive the motor and a driving power supply instruction to supply a driving electric power to the motor, supply of the driving electric power to the motor. The camera controller is configured to cause the lens controller to perform the supply of the driving electric power to the motor by sending, to the lens controller through the communication, the drive instruction and the driving power supply instruction.

The present invention provides as still another aspect thereof a method of controlling an interchangeable lens which is detachably attachable to a camera and comprises a motor to move or actuate a driven member. The method includes performing communication with the camera, and performing, in response to receipt, from the camera through the communication, of a drive instruction to drive the motor and a driving power supply instruction to supply a driving electric power to the motor, supply of the driving electric power to the motor.

The present invention provides as yet still another aspect thereof a method of controlling a camera to which an interchangeable lens comprising a motor to move or actuate a driven member included therein is detachably attachable. The method includes performing communication with the interchangeable lens, and causing the interchangeable lens to perform supply of a driving electric power to the motor by sending, to the interchangeable lens through the communication, a drive instruction to drive the motor and a driving power supply instruction to supply the driving electric power to the motor.

Other aspects of the present invention will become apparent from the following description and the attached drawings.

DETAILED DESCRIPTION OF THE PREFERRED EMBODIMENTS

Embodiments of the present invention will hereinafter be described with reference to the accompanying drawings.

Embodiment 1

Figure 1:
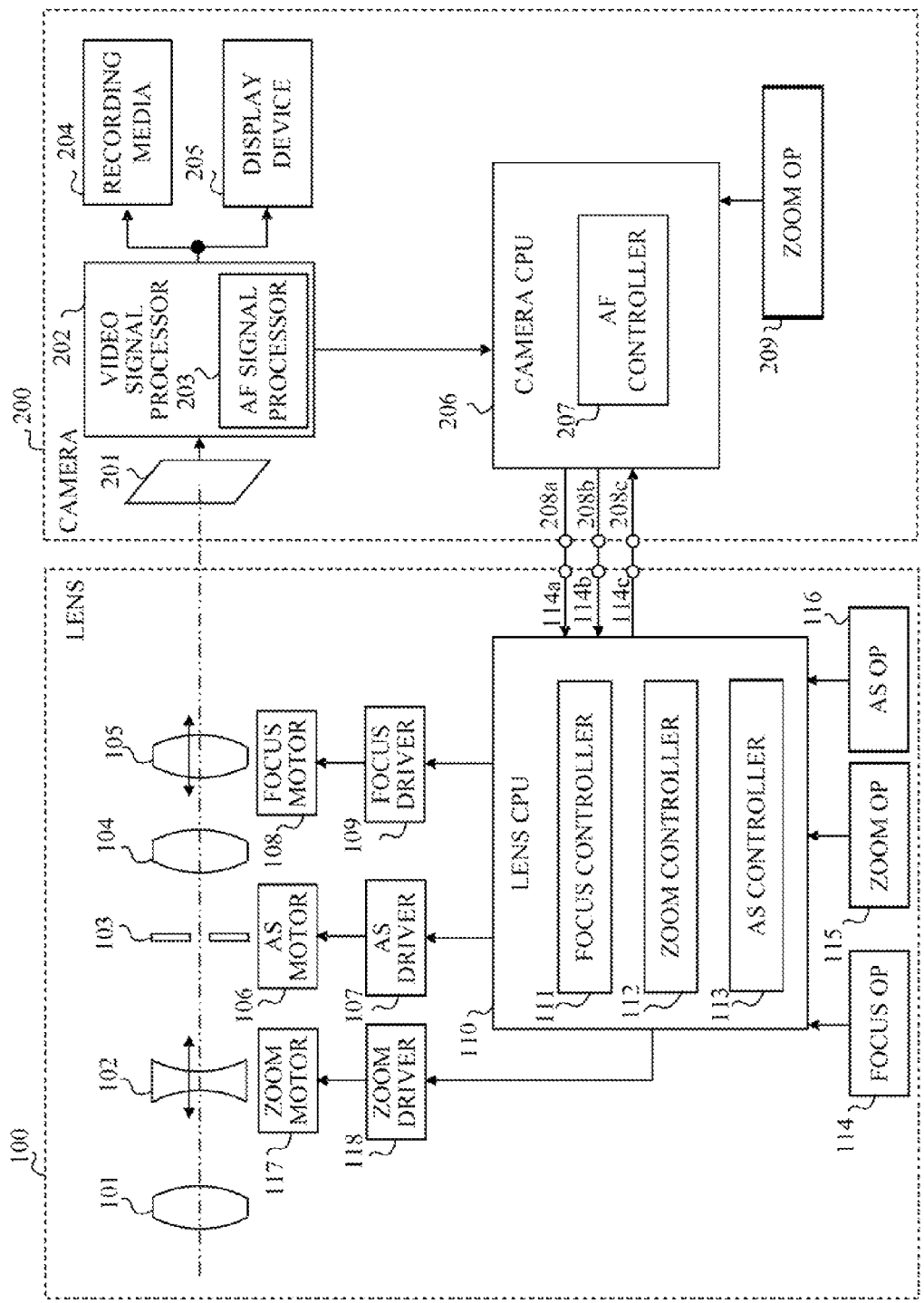
FIG. 1 is a block diagram showing a configuration of a lens-interchangeable camera system including an interchangeable lens and a camera which are Embodiment 1 of the present invention.

FIG. 1 shows a configuration of a lens-interchangeable camera system including an interchangeable lens 100 and a digital camera (hereinafter simply referred to as "a camera") 200, which are a first embodiment (Embodiment 1) of the present invention. The interchangeable lens 100 is detachably attachable to the camera 200 and is capable of performing communication with the camera 200 in their attached state. Moreover, the interchangeable lens 100 receives supply of a source electric power from the camera 200.

The camera 200 sends, to the interchangeable lens 100 through the communication, a motor drive instruction to drive a motor for focus drive provided in the interchangeable lens 100 and an energization ON instruction as a driving power supply instruction to supply a driving electric power to the motor. Furthermore, the camera 200 sends, to the interchangeable lens 100 through the communication, a motor drive stop instruction to stop the drive of the motor and an energization OFF instruction as a power saving instruction to save power.

In this embodiment, the "energization ON" means to start the supply of the driving electric power for driving (rotating) the motor. On the other hand, the "energization OFF" means to stop the supply of the driving electric power to the motor, which includes only to cut off electric power supply to the motor, but also to supply a lower electric power than the driving electric power to the motor. The energization OFF instruction instructs the interchangeable lens 100 to move to a power saving state of reducing power consumption by the motor.

The interchangeable lens does not move to a state of the above-mentioned energization OFF (that is, the power saving state; hereinafter referred to as "an energization OFF state"), even when receiving the energization OFF instruction from the camera during the drive of the motor and during a stop holding energization (described later) performed when stopping the drive of the motor, before completion of the stop holding energization. In other words, the interchangeable lens maintains the stop holding energization until its completion, and thereafter moves to the energization OFF state.

As shown in FIG. 1, the interchangeable lens 100 is provided with electric contacts 114a, 114b and 114c. On the other hand, the camera 200 is provided with electric contacts 208a, 208b and 208c to be electrically connected respectively with the electric contacts 114a, 114b and 114c of the interchangeable lens 100. Through the electric contacts 114a-114c and 208a-208c, the camera 200 and the interchangeable lens 100 communicate (send and receive) various instructions and various information therebetween, and the camera 200 supplies the source electric power to the interchangeable lens 100.

The interchangeable lens 100 holds thereinside an image capturing optical system. The image capturing optical system includes, in order from an object side to an image side (camera side), a fixed lens 101, a magnification-varying lens 102, an aperture stop 103, a fixed afocal lens 104 and a focus lens 105. Each of the lenses 101, 102, 104, 105 may be constituted by a single lens or multiple lenses.

The magnification-varying lens 102 is moved in an optical axis direction of the image capturing optical system by receiving a driving force from a zoom motor 117 constituted by a stepping motor, a DC motor or the like to change a focal length of the image capturing optical system, that is, to perform variation of magnification. A zoom driver 118 supplies a driving electric power (driving voltage or driving current) to the zoom motor 117.

The aperture stop 103 is driven by a driving force from an aperture stop motor 106 constituted by a stepping motor, a DC motor or the like to change its aperture diameter. An aperture stop driver 107 supplies a driving electric power (driving voltage or driving current) to the aperture stop motor 106. The aperture stop is abbreviated as "AS" in FIG. 1.

The focus lens 105 as a driven member is moved in the optical axis direction by receiving a driving force from a focus motor 108 (which is the above-mentioned motor for focus drive) constituted by a stepping motor, a DC motor, a vibration type motor (also called an ultrasonic motor) or the like to perform focusing. A focus driver 109 supplies a driving electric power (driving voltage or driving current) to the focus motor 108.

On the other hand, in the camera 200, an image sensor (image pickup element) 201 is a photoelectric conversion element such as a CCD sensor or a CMOS sensor. The image sensor 201 photoelectrically converts an optical image (object image) formed on its image pickup surface by the image capturing optical system to output an image pickup signal as an analog electric signal. The image pickup signal output from the image sensor 201 is input to a video signal processor 202 at predetermined timings.

The video signal processor 202 has an AD conversion function of converting the input image pickup signal to a digital signal, and performs various signal processes such as an amplification process and a gamma correction process on the digital image pickup signal to produce a video signal. The produced video signal is output to a display device 205 such as a liquid crystal panel to be displayed, and output to a recording media 204 such as a magnetic disk or a semiconductor memory to be recorded. Moreover, the video signal is output to a camera CPU 206 serving as a camera communicator and a camera controller.

The video signal processor 202 includes an AF signal processor 203. The AF signal processor 203 extracts a high frequency component or a brightness difference component from the video signal in an AF area of an image capturing frame to produce a focus evaluation value signal (or focus signal). The AF area is a partial area in which detection of a focus state (that is, focus detection) of the image capturing optical system is performed. The focus evaluation value signal shows contrast (sharpness) of the video signal and changes with the focus state of the image capturing optical system. A position of the focus lens 105 where the focus evaluation value signal becomes peak is an in-focus position for the AF area.

The camera CPU 206 includes an AF controller 207. The AF controller 207 produces the above-mentioned motor drive instruction (hereinafter referred to as "a focus drive instruction") on a basis of the focus evaluation value signal from the AF signal processor 203 and sends the focus drive instruction to a lens CPU 110 serving as a lens communicator and a lens controller provided in the interchangeable lens 100.

The communication between the camera 200 and the interchangeable lens 100 is performed specifically between the camera CPU 206 and the lens CPU 110. FIG. 1 shows a case where three-line serial communication is performed between the camera CPU 206 and the lens CPU 110.

The lens CPU 110 includes a focus controller 111. The focus controller 111 performs focus control on a basis of information on a movement target position of the focus lens 105 included in the focus drive instruction sent from the AF controller 207 or of focus operation information from a focus operating portion 114 (operating portion is abbreviated as "OP" in FIG. 1) provided in the interchangeable lens 100. The focus drive instruction includes a wobbling drive instruction, a hill-climbing drive instruction and peak returning drive instruction, which are described later. The focus operation information shows a direction and an amount of focusing by manual focus. The focus control actually means control of drive of the focus motor 108. Control of the drive of the focus motor 108 according to the focus drive instruction enables autofocus (AF) by a contrast detection method. Moreover, control of the drive of the focus motor 108 according to the focus operation information enables the manual focus.

The lens CPU 110 further includes a zoom controller 112. The zoom controller 112 performs zoom control on a basis of zoom operation information from a zoom operating portion 115 provided in the interchangeable lens 100 or from a zoom operating portion 209 provided in the camera 200. The zoom operation information shows a direction and an amount of the variation of magnification. The zoom control actually means control of drive of the zoom motor 117.

In addition, the lens CPU 110 includes an aperture stop controller 113. The aperture stop controller 113 performs aperture stop control on a basis of information on an aperture stop drive amount sent from the camera CPU 206 or aperture stop operation information from an aperture stop operating portion 116 provided in the interchangeable lens 100. The aperture stop operating portion 116 may be provided in the camera 200. The aperture stop control actually means control of drive of the aperture stop motor 106.

Next, description will be made of processes relating to the control of the drive of the focus motor 108 performed by the lens CPU 110 and the camera CPU 206 with reference to a flowchart shown in FIG. 2. These processes are performed by the lens CPU 110 and the camera CPU 206 according to computer programs respectively stored therein. This applies also to other embodiments described later.

First, description will be made of the process performed by the camera CPU 206. At step (hereinafter abbreviated as "S") 101, the camera CPU 206 sends the energization ON instruction to the lens CPU 110.

Next, at S102, the camera CPU 206 sends, to the lens CPU 110, the above-mentioned wobbling drive instruction to cause the focus lens 105 to perform wobbling drive. The wobbling drive is to drive the focus lens 105 so as to be reciprocated with a minute drive amount in the optical axis direction. This flowchart omits, for simplification of description, a process in which the lens CPU 110 receiving the energization ON instruction and the wobbling drive instruction drives the focus motor 108 and stops the drive thereof. Actually, the lens CPU 110 (focus controller 111) drives the focus motor 108 with inverting a drive direction thereof after each drive by the minute drive amount.

At S103, the camera CPU 206 determines whether to have detected a peak of the focus evaluation value signal obtained during the wobbling drive or not, that is, whether to have detected an in-focus state or not. If having detected the peak, the camera CPU 206 proceeds to an AF restart process at S108. If not having detected the peak, the camera CPU 206 proceeds to S104.

At S104, the camera CPU 206 sends, to the lens CPU 110, the above-mentioned hill-climbing drive instruction to move the focus lens 105 in a direction in which a peak position where the focus evaluation value signal becomes its peak is presumed to exist, that is, in which the focus evaluation value signal increases. This drive of the focus lens 105 (focus motor 108) is referred to as "hill-climbing drive".

Then, at S105, the camera CPU 206 determines whether the focus evaluation value signal has passed the peak or not. If the focus evaluation value signal has not passed the peak, the camera CPU 206 continues the hill-climbing drive. On the other hand, if the focus evaluation value signal has passed the peak, the camera CPU 206 proceeds to S106 to send, to the lens CPU 110, the above-mentioned peak returning drive instruction of the focus motor 108 to move (return) the focus lens 105 to the peak position (in-focus position).

Moreover, at S107, the camera CPU 206 determines whether the focus evaluation value signal has reached the peak or not. If the focus evaluation value signal has reached the peak, the camera CPU 206 returns to S102 to again send the wobbling drive instruction to the lens CPU 110. If the focus evaluation value signal has not reached the peak, the camera CPU 206 returns to S106 to again send the peak returning drive instruction to the lens CPU 110.

The camera CPU 206 proceeding from S103 to S108 determines whether an AF restart is needed or not. Specifically, the camera CPU 206 determines whether to reperform the AF when the focus evaluation value signal changes greatly and when an aperture value of the aperture stop 103 is changed. If the AF restart is needed, the camera CPU 206 returns to S102 to send the wobbling drive instruction to the lens CPU 110.

On the other hand, if the AF restart is not needed, the camera CPU 206 proceeds to S109 to send, to the lens CPU 110, a focus drive stop instruction as the above-mentioned motor drive stop instruction to stop the movement of focus lens 105 (that is, the drive of the focus motor 108). The lens CPU 110 (focus controller 111) stops the drive of the focus motor 108 in response to receipt of the focus drive stop instruction. The lens CPU 110 immediately stops the drive of the focus motor 108 in response to the receipt of the focus drive stop instruction, but does not immediately move to the above-mentioned energization OFF state (power saving state) and performs a stop holding energization described later to continue energization of the focus motor 108 for a predetermined time period.

Finally, at S110, the camera CPU 206 sends the above-mentioned energization OFF instruction to the lens CPU 110.

Next, description will be made of a process performed by the lens CPU 110, particularly of an energization ON/OFF control process for the focus motor 108. The lens CPU 110 determines at S201 whether to have received the energization ON instruction sent from the camera CPU 206 (S101) or not. The lens CPU 110 further determines at this step whether to have received the wobbling drive instruction sent from the camera CPU 206 (S102) or not. If not having received at least one of the energization ON instruction and the wobbling drive instruction, the lens CPU 110 proceeds to S204. If having received both the energization ON instruction and the wobbling drive instruction, the lens CPU 110 proceeds to S202.

At S202, the lens CPU 110 determines whether the focus motor 108 is currently in an energization ON state (power-supplied state) or not. If the focus motor 108 is not currently in the energization ON state, the lens CPU 110 proceeds to S203 to start (turn ON) energization of the focus motor 108, that is, to start supply of the driving electric power thereto.

If determining at S201 that lens CPU 110 have not received the energization ON instruction and if determining at S202 that the focus motor 108 is currently in the energization ON state, the lens CPU 110 proceeds to S204 to determine whether to have received the energization OFF instruction sent from the camera CPU 206 (S110) or not. The lens CPU 110 further determines at this step whether to have received the focus drive stop instruction sent form the camera CPU 206 (S109) or not. If not having received at least one of the energization OFF instruction and the focus drive stop instruction, the lens CPU 110 returns to S201. If having received both the energization OFF instruction and the focus drive stop instruction, the lens CPU 110 proceeds to S205.

At S205, the lens CPU 110 determines whether the focus motor 108 is currently still being driven or in a middle of the stop holding energization, that is, whether to have received the energization OFF instruction and the focus drive stop instruction during the drive of the focus motor 108 or during the stop holding energization. The stop holding energization is performed when stopping drive of a motor (the focus motor 108 in this embodiment) by supplying to the motor a predetermined electric power equal to or lower than a driving electric power to drive the motor so as to hold the motor in a stopped state. This stop holding energization enables suppression of generation of vibration from the motor, which is likely to be generated when the motor is stopped.

The stepping motor generates, when energization thereof is started from a state where the energization is cut off, a small movement (rotation) from a stop position to an electric excitation position. Moreover, the stepping motor generates, when energization thereof is cut off from a state where the energization is made, a small movement (rotation) from the electric excitation position by a magnetic attracting force (detent torque). Therefore, repetition of the energization and the energization cutoff causes repetition of these small movements, which generates vibration of the motor and thereby causes noise (vibration sound).

Moreover, the vibration type motor excites vibration to an elastic member (oscillator) by using a piezoelectric element and rotationally drives a rotator in contact with the elastic member with pressure. In this vibration type motor, in a state where energization of the piezoelectric element is cut off, the oscillator and the rotator make close contact with each other. On the other hand, in a state where the energization of the piezoelectric element is made, the oscillator makes contact with the rotator at antinodes of the vibration, that is, at places where amplitude of the vibration becomes maximum, which means that the oscillator and the rotator make non-close contact with each other. Thus, repetition of the energization and the energization cutoff causes vibration and vibration sound due to repetition of the close contact and the non-close contact of the oscillator and the rotator.

The stop holding energization is performed to suppress these vibrations. The predetermined time period for which the stop holding energization is performed is, for example, from several ms to several tens of ms for the stepping motor. The above-described vibration of the motor might be generated not only when the energization and the energization cutoff are repeated, but also when supply of a lower electric power than that for the stop holding energization and supply of a higher electric power than that for the stop holding energization are repeated.

At S205, if determining that the focus motor 108 is currently still being driven or in the middle of the stop holding energization, the lens CPU 110 returns to S204 because movement to the energization OFF state is inhibited. On the other hand, if determining that the focus motor 108 is currently neither being driven nor in the middle of the stop holding energization (that is, if the stop holding energization for the predetermined time period has been completed), the lens CPU 110 proceeds to S206.

At S206, the lens CPU 110 determines whether the focus motor 108 is currently in the energization OFF state or not. If the focus motor 108 is currently in the energization OFF state, the lens CPU 110 returns to S201. If the focus motor 108 is not currently in the energization OFF state, the lens CPU 110 proceeds to S207 to move to the energization OFF state.

Thus, in this embodiment, movement to the energization OFF state is performed in response to the receipt of both the focus drive stop instruction and the energization OFF instruction as the power saving instruction from the camera 200, that is, not performed in response to the receipt only of the focus drive stop instruction. The lens CPU 110 repeatedly performs the above-described process.

Figure 2:
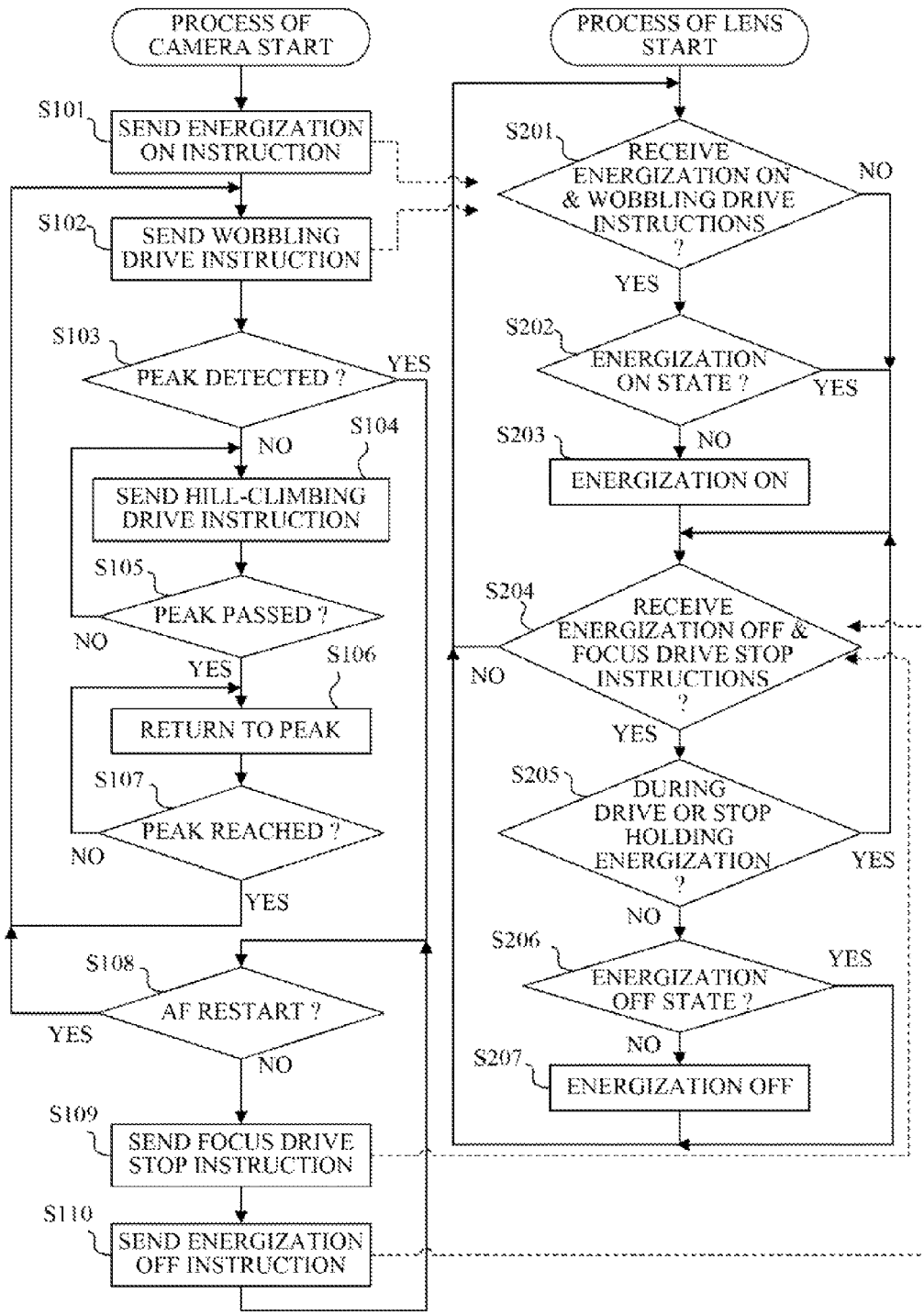
FIG. 2 is a flowchart showing processes performed by a camera CPU and a lens CPU in Embodiment 1.
Figure 3:
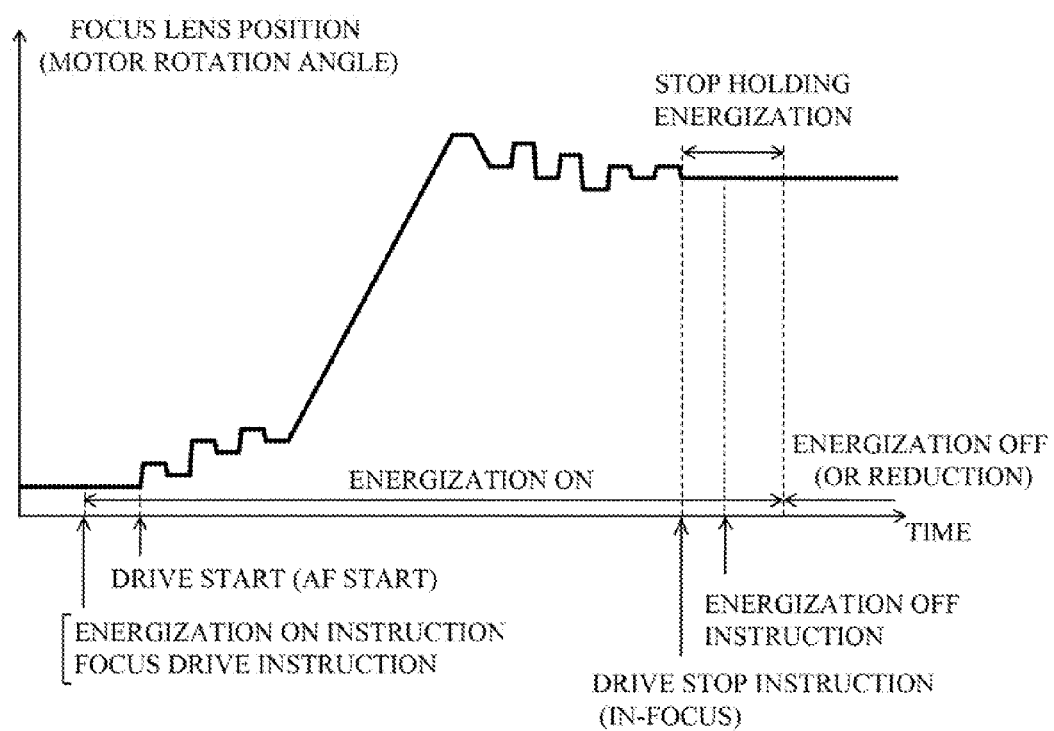
FIG. 3 is a timing chart showing an example of motor energization control in Embodiment 1.

FIG. 3 shows an example of positions of the focus lens 105 (in other words, accumulated rotation angle of the focus motor 108) and timings of the energization ON instruction, start and stop of the drive of the focus motor 108, the energization OFF instruction and the movement to the energization OFF state, which are obtained according to the process shown in FIG. 2. After sending of the energization ON instruction and the motor drive instruction (wobbling drive instruction) from the camera CPU 206 to the lens CPU 110, the drive of the focus motor 108 (AF) is started.

Then, in response to arrival of the focus lens 105 at the in-focus position through the wobbling drive and the hill-climbing drive, the focus drive stop instruction and the energization OFF instruction are sent from the camera CPU 206 to the lens CPU 110. The lens CPU 110 stops the drive of the focus motor 108 (AF) in response to receipt of the focus drive stop instruction and starts the stop holding energization. FIG. 3 shows a case where the lens CPU 110 receives the energization OFF instruction during the stop holding energization. The lens CPU 110 continues the stop holding energization even if receiving the energization OFF instruction during the stop holding energization. Then, the lens CPU 110 moves to the energization OFF state after completion of the stop holding energization.

In a case where the CPU 110 independently manages the energization of the focus motor 108, the lens CPU 110 starts the energization of the focus motor 108 in response to receipt of the focus drive instruction sent from the camera CPU 206. Then, the lens CPU 110 moves to the energization OFF state after completion of the stop holding energization without receiving the energization OFF instruction from the camera CPU 206. In this case, if a time period to stop the focus motor 108 is longer than that of the stop holding energization when the drive and the stop of the focus motor 108 are repeated as in the wobbling drive, the energization ON and the energization OFF are also repeated, which results in generation of the vibration of the focus motor 108 and the vibration sound therefrom.

On the other hand, in this embodiment, the camera CPU 206 knowing a current state of the AF (that is, whether the AF is in the wobbling drive, in the hill-climbing drive or in the in-focus state) manages the energization ON and OFF of the focus motor 108. This configuration can prevent the energization ON and OFF of the focus motor 108 which generates the vibration of the focus motor 108 and the vibration sound therefrom from being performed. That is, this embodiment can suppress the generation of the vibration sound from the focus motor 108 and thereby can achieve a high level of silence while reducing the power consumption in the interchangeable lens 100.

Embodiment 2

Next, description will be made of a second embodiment (Embodiment 2) of the present invention. In this embodiment, a method of managing the energization ON and OFF of the focus motor 108 is switched depending on a communication method to be used between the camera 200 and the interchangeable lens 100, that is, depending on whether the communication method is a synchronous communication method or an asynchronous communication method.

Communication by the synchronous communication method (hereinafter referred to as "synchronous communication") performs packet communication every predetermined period such as every vertical synchronization period of a video signal, and sends and receives information between the camera 200 and the interchangeable lens 100. On the other hand, communication by the asynchronous communication method (hereinafter referred to as "asynchronous communication") sends and receives only necessary information at necessary timings between the camera 200 and the interchangeable lens 100.

Figure 4:
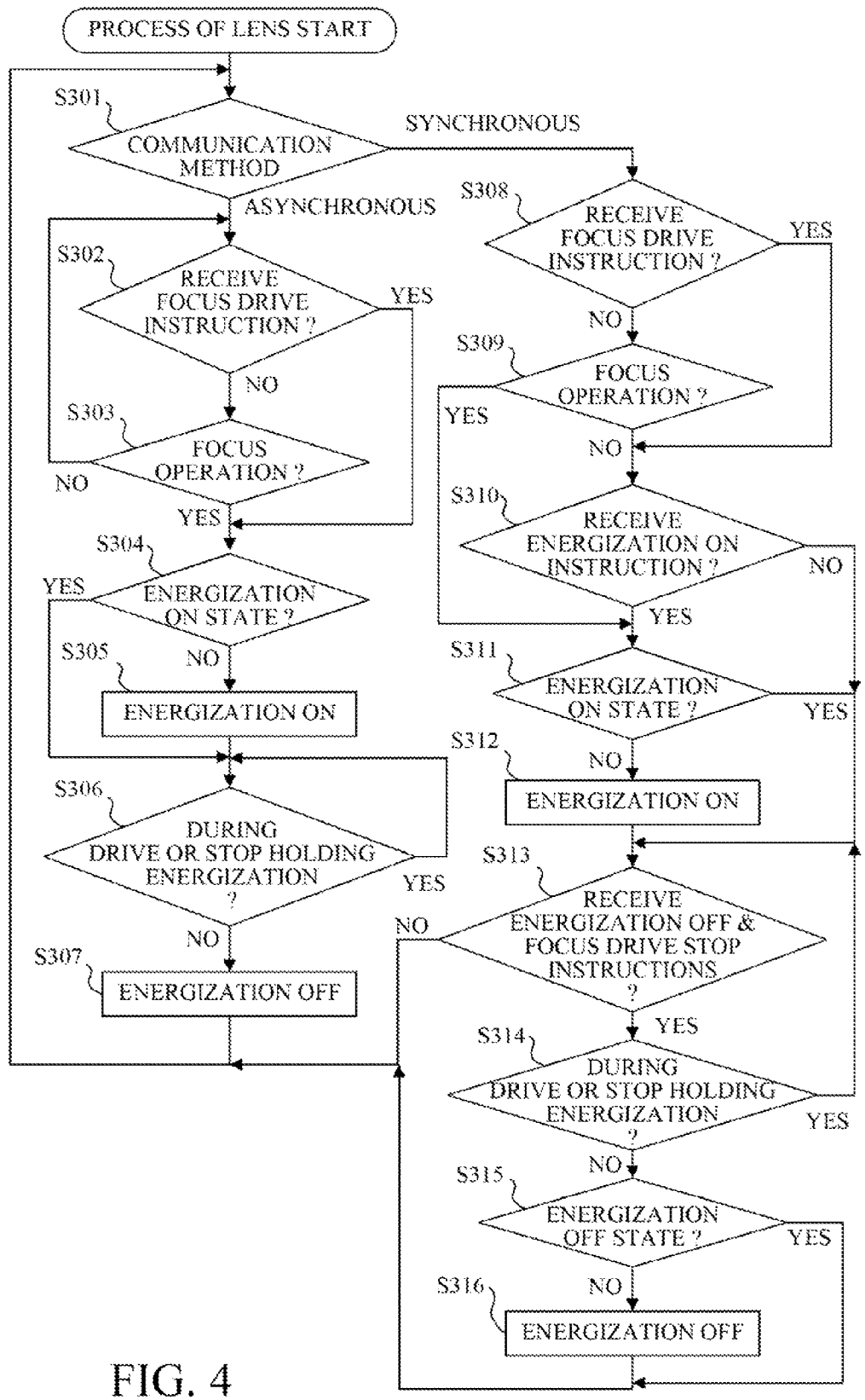
FIG. 4 is a flowchart showing a process performed by a lens CPU provided in an interchangeable lens which is Embodiment 2 of the present invention.

FIG. 4 is a flowchart showing a process performed by the lens CPU 110 in this embodiment. The camera 200 and the interchangeable lens 100 have the same configurations as those in Embodiment 1. Instructions and states relating to drive and energization of the focus motor 108 in this embodiment (and in other embodiments described later) are also same as those described in Embodiment 1.

At S301, the lens CPU 110 determines whether current communication is the synchronous communication or the asynchronous communication. If the current communication is the asynchronous communication, the lens CPU 110 proceeds to S302 to determine whether to have received, as a communication command, the focus drive instruction to move the focus lens 105 (that is, to drive the focus motor 108). The focus drive instruction includes, as in Embodiment 1, the wobbling drive instruction, the hill-climbing drive instruction and the peak returning drive instruction.

If not having received the focus drive instruction, the lens CPU 110 determines at S303 whether the focus operation has been performed in the focus operating portion 114 (that is, whether the focus operation information has been input) or not. If the focus operation has not been performed, the lens CPU 110 continues the receipt of the focus drive instruction and the determination of presence or absence of the focus operation.

If having received the focus drive instruction or if the focus operation has been performed, the lens CPU 110 proceeds to S304 to determine whether the focus motor 108 is currently in the energization ON state (power-supplied state) or not. If the focus motor 108 is not currently in the energization ON state, the lens CPU 110 proceeds to S305 to start (turn ON) energization of the focus motor 108 (that is, to start supply of the driving electric power thereto). If the focus motor 108 is currently in the energization ON state, the lens CPU 110 proceeds to S306.

After completion of necessary drive of the focus lens 108, the lens CPU 110 determines at S306 whether the focus motor 108 is currently still being driven or in a middle of the stop holding energization. If the focus motor 108 is currently still being driven or in the middle of the stop holding energization, the lens CPU 110 repeats the determination at S306. If the focus motor 108 is currently neither being driven nor in the middle of the stop holding energization (that is, if the stop holding energization for the predetermined time period has been completed), the lens CPU 110 proceeds to S307 to move to the energization OFF state.

On the other hand, at S301, if the current communication is the synchronous communication, the lens CPU 110 proceeds to S308 to determine, as well as in the case of the asynchronous communication, whether to have received the focus drive instruction or not. If not having received the focus drive instruction, the lens CPU 110 proceeds to S309 to determines whether the focus operation has been performed or not. If the focus operation has also not been performed, the lens CPU 110 proceeds to S310. If the focus operation has been performed, the lens CPU 110 skips S310 and proceeds to S311.

If having received the focus drive instruction at S308, the lens CPU 110 proceeds to S310 to determine whether to have received the energization ON instruction sent from the camera CPU 206 or not. If having received the energization ON instruction, the lens CPU 110 proceeds to S311.

When the synchronous communication is performed, the lens CPU 110 normally receives the energization ON instruction before the receipt of the focus drive instruction. However, there is a possibility that the lens CPU 110 receives the focus drive instruction before the receipt of the energization ON instruction, and thus the lens CPU 110 performs the determination at S308. Moreover, the drive of the focus motor 108 in response to the focus operation is performed independently in the interchangeable lens 100, which is different from the AF, so that the lens CPU 110 starts (turns ON) energization of the focus motor 108 without receiving the energization ON instruction.

At S311, the lens CPU 110 determines whether the focus motor 108 is currently in the energization ON state or not. If the focus motor 108 is currently in the energization ON state, the lens CPU 110 proceeds to S313. If the focus motor 108 is not currently in the energization ON state, the lens CPU 110 proceeds to S312 to start (turn ON) energization of the focus motor 108.

At S313, the lens CPU 110 determines whether to have received the energization OFF instruction sent from the camera CPU 206 or not. The lens CPU 110 further determines at this step whether to have received the focus drive stop instruction sent form the camera CPU 206 or not. If having not received at least one of the energization OFF instruction and the focus drive stop instruction, the lens CPU 110 returns to S301. If having received both the energization OFF instruction and the focus drive stop instruction, the lens CPU 110 proceeds to S314.

At S314, the lens CPU 110 determines whether the focus motor 108 is currently still being driven or in a middle of the stop holding energization. If the focus motor 108 is currently still being driven or in the middle of the stop holding energization, the lens CPU 110 returns to S313. If the focus motor 108 is currently neither being driven nor in the middle of the stop holding energization (that is, if the stop holding energization for the predetermined time period has been completed), the lens CPU 110 proceeds to S315 to determine whether the focus motor 108 is currently in the energization OFF state or not. If the focus motor 108 is currently in the energization OFF state, the lens CPU 110 returns to S301. If the focus motor 108 is not currently in the energization OFF state, the lens CPU 110 proceeds to S316 to move to the energization OFF state.

As described above, in this embodiment, when performing the asynchronous communication, the lens CPU 110 starts the drive (energization) of the focus motor 108 in response to the receipt of the focus drive instruction without receiving the energization ON instruction from the camera CPU 206. Then, after the completion of the necessary drive of the focus motor 108, the lens CPU 110 moves, without receiving the energization OFF instruction from the camera CPU 206, to the energization OFF state after the completion of the stop holding energization.

On the other hand, when performing the synchronous communication, the lens CPU 110 starts the drive (energization) of the focus motor 108 in response to the receipt of both the focus drive instruction and the energization ON instruction from the camera CPU 206. Then, the lens CPU 110 moves, in response to the receipt of both the focus drive stop instruction and the energization OFF instruction from the camera CPU 206, to the energization OFF state after the completion of the stop holding energization.

In the synchronous communication, communication is performed every predetermined period, so that it is easy to provide the energization ON and OFF instructions from the camera CPU 206 to the lens CPU 110 at each period. On the other hand, in the asynchronous communication, it is possible for the camera CPU 206 to provide the energization ON and OFF instructions to the lens CPU 110 at its own timings.

However, the interchangeable lens 100 (lens CPU 110) often cannot surely perform the energization ON and OFF according to the received energization ON and OFF instructions because, for example, the focus motor 108 is being driven or in the middle of the stop holding energization, or the lens CPU 110 prioritize other processes.

Moreover, when the focus drive instruction is sent from the camera CPU 206 to the lens CPU 110, it is sufficient that the drive of the focus motor 108 be started after the sending of the focus drive instruction. Therefore, it is not necessary to start the energization of the focus motor 108 before the sending of the focus drive instruction. Thus, when the asynchronous communication is performed, the receipt of the energization ON and OFF instructions is not a condition for the energization ON and OFF of the focus motor 108, which is different from when the synchronous communication is performed.

Embodiment 3

Next, description will be made of a third embodiment (Embodiment 3) of the present invention. Although Embodiment 2 described the case of switching the method of managing the energization ON and OFF of the focus motor 108 depending on the communication method employed between the camera 200 and the interchangeable lens 100, this embodiment will describe a case of performing a similar switching of the method of managing the energization ON and OFF depending on whether to perform still image capturing or video capturing.

Figure 5:
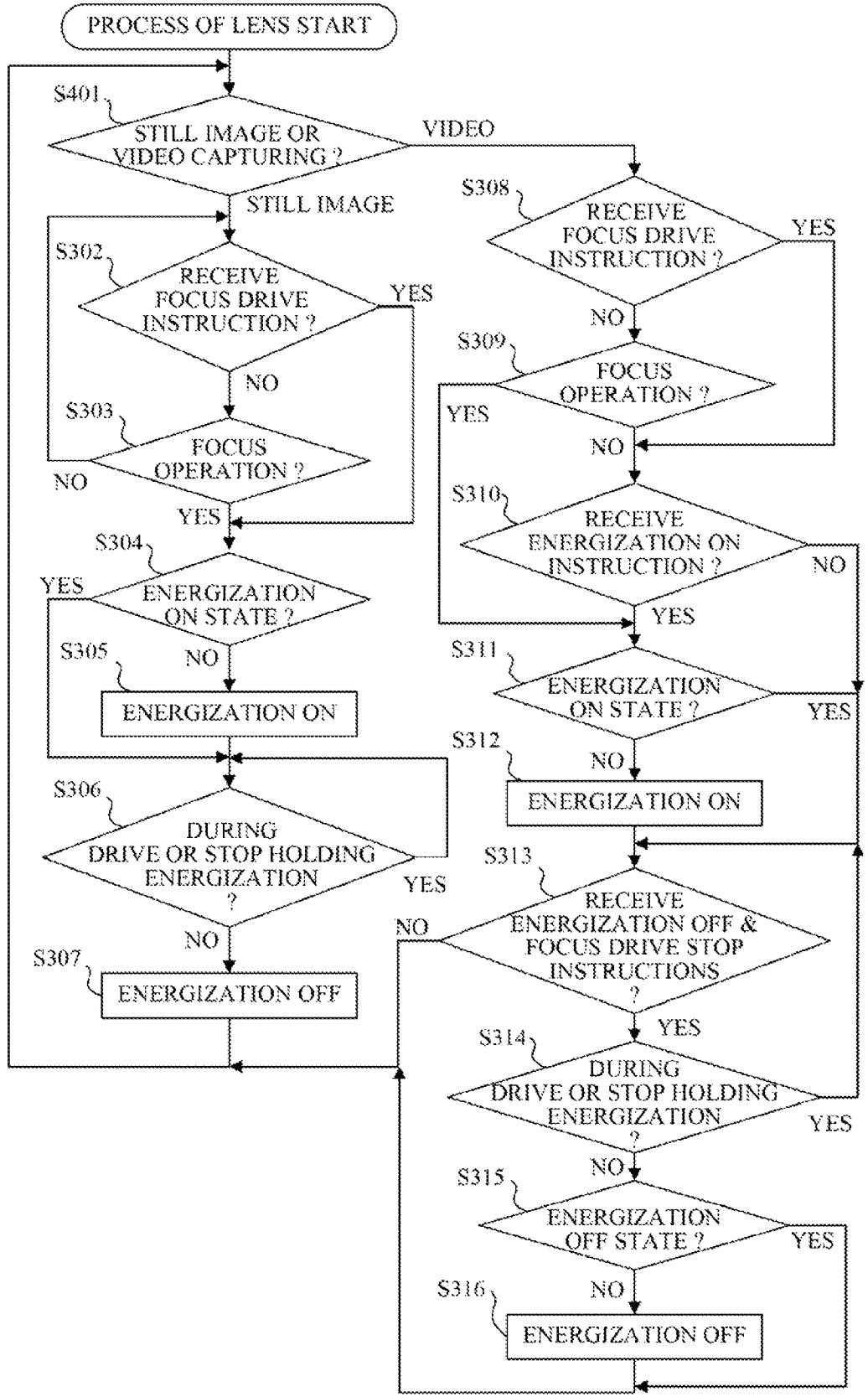
FIG. 5 is a flowchart showing a process performed by a lens CPU provided in an interchangeable lens which is Embodiment 3 of the present invention.

FIG. 5 is a flowchart showing a process performed by the lens CPU 110 in this embodiment. The camera 200 and the interchangeable lens 100 have the same configurations as those in Embodiment 1. The camera 200 in this embodiment is capable of switching its image capturing mode between a still image capturing mode and a video capturing mode.

At S401, the lens CPU 110 determines whether a current image capturing mode of the camera 200 is the still image capturing mode or the video image capturing mode. If the current image capturing mode is the still image capturing mode, the lens CPU 110 proceeds to S302. If the current image capturing mode is the video capturing mode, the lens CPU 110 proceeds to S308. Processes at S302 and subsequent steps in the still image capturing mode and processes at S308 and subsequent steps in the video capturing mode are same as those at S302 and subsequent steps and at S308 and subsequent steps shown in FIG. 4.

In this embodiment, when the camera 200 performs the still image capturing, the lens CPU 110 starts drive (energization) of the focus motor 108 in response to receipt of the focus drive instruction from the camera CPU 206 without receiving the energization ON instruction from the camera CPU 206. Then, after completion of necessary drive of the focus motor 108, the lens CPU 110 moves, without receiving the energization OFF instruction from the camera CPU 206, to the energization OFF state after the completion of the stop holding energization.

On the other hand, when the camera 200 performs the video capturing, the lens CPU 110 starts the drive (energization) of the focus motor 108 in response to receipt of both the focus drive instruction and the energization ON instruction from the camera CPU 206. Then, the lens CPU 110 moves, in response to receipt of both the focus drive stop instruction and the energization OFF instruction from the camera CPU 206, to the energization OFF state after the completion of the stop holding energization.

Since the video capturing is performed with sound recording, a high level of silence achieved by reducing noise including the vibration sound from the focus motor 108 as much as possible is required. Thus, providing the energization ON and OFF instructions to the lens CPU 110 from the camera CPU 206 knowing in advance the timings at which the energization ON and OFF of the focus motor 108 should be performed enables suppression of generation of the vibration sound from the focus motor 108.

On the other hand, for the still image capturing, increase of number of capturable images by reducing power consumption is required. Thus, in this embodiment, the lens CPU 110 manages the energization ON and OFF of the focus motor 108, starts the energization of the focus motor 105 as needed, and then moves to the energization OFF state as quickly as possible.

Embodiment 4

Next, description will be made of a fourth embodiment (Embodiment 4) of the present invention. In this embodiment, a determination is made of whether the interchangeable lens 100 is responsive to the energization OFF instruction (in other words, whether the interchangeable lens 100 is non-responsive thereto) or not, and switching of the method of managing the energization ON and OFF of the focus motor 108 depending on the determination result. A cases where the interchangeable lens 100 is non-responsive to the energization OFF instruction is, for example, a case where the interchangeable lens 100 uses a motor that always requires the stop holding energization, such as a motor rotating by itself after cutoff of its energization and a voicecoil motor having no stop holding force in a non-energization state.

In a case where the interchangeable lens 100 is responsive to the energization OFF instruction, the camera CPU 206 and the lens CPU 110 performs the processes shown in FIG. 2 in Embodiment 1. On the other hand, in the case where the interchangeable lens 100 is non-responsive to the energization OFF instruction, the camera CPU 206 and the lens CPU 110 performs the processes shown in a flowchart of FIG. 6.

Figure 6:
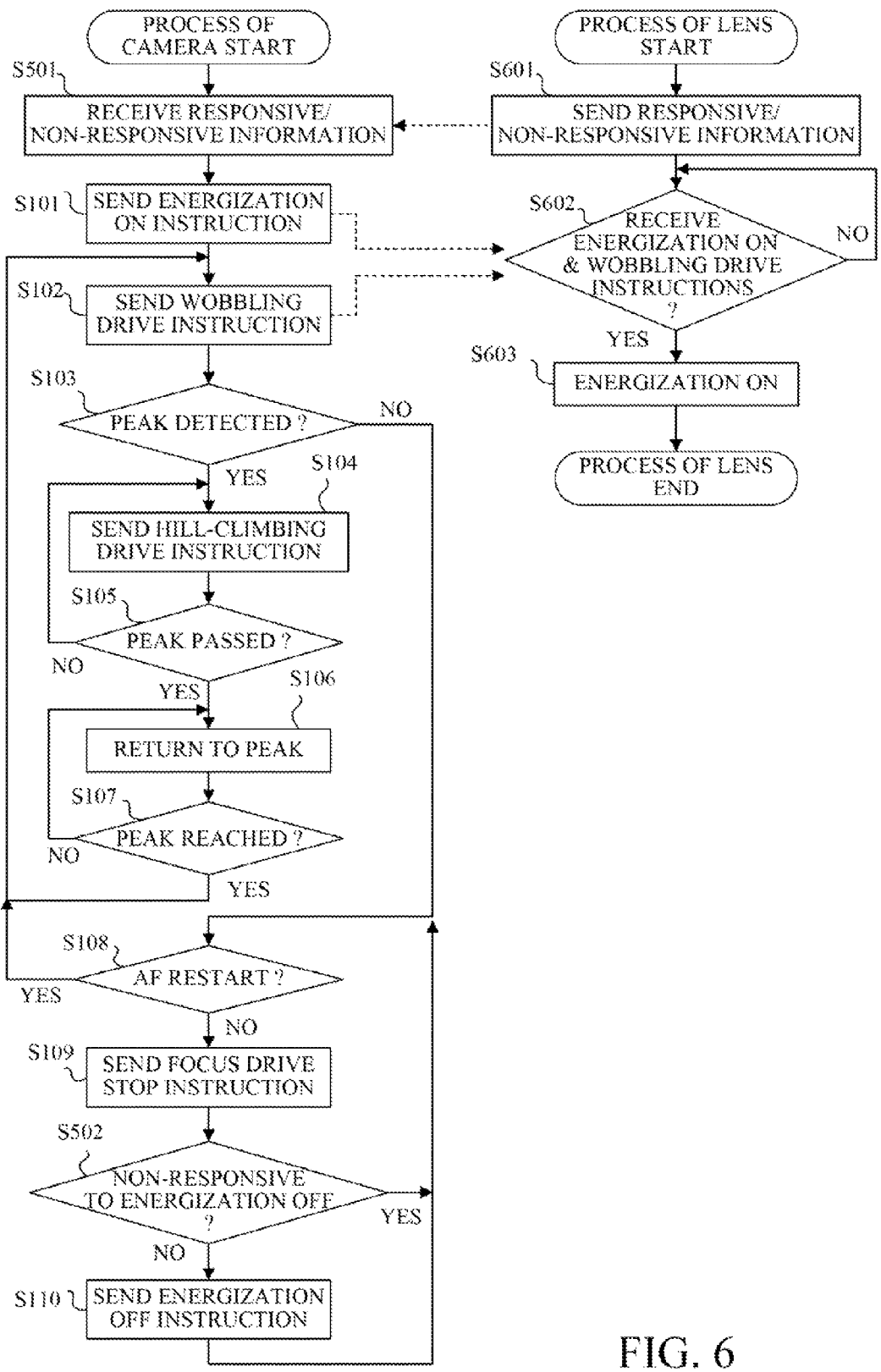
FIG. 6 is a flowchart showing processes performed by a camera CPU and a lens CPU respectively provided in an interchangeable lens and a camera which are Embodiment 4 of the present invention.

In FIG. 6, the camera CPU 206 and the lens CPU 110 perform, respectively at S501 and S601, communication therebetween; the lens CPU 110 sends information on whether the interchangeable lens 100 is responsive or non-responsive to the energization OFF instruction to the camera CPU 206.

The camera CPU 206 first sends at S101 the energization ON instruction to the lens CPU 110. In the case where the interchangeable lens 100 is non-responsive to the energization OFF instruction, the camera CPU 206 does not hereafter send the energization OFF instruction to the lens CPU 110.

Processes hereafter performed at S102 to S109 are same as those performed at S102 to S109 shown in FIG. 2 in Embodiment 1.

After S109, the camera CPU 206 determines at S502 whether the interchangeable lens 100 is non-responsive to the energization OFF instruction or not, on a basis of the information received from the lens CPU 110 at S501. If the interchangeable lens 100 is responsive to the energization OFF instruction, the camera CPU 206 proceeds to S110 shown in FIG. 2 in Embodiment 1 to send the energization OFF instruction to the lens CPU 110. If the interchangeable lens 100 is non-responsive to the energization OFF instruction, the camera CPU 206 returns to S108 (AF restart determination) without sending the energization OFF instruction to the lens CPU 110.

Moreover, when receiving the energization ON instruction and the wobbling drive instruction from the camera CPU 206 at S602 after S601, the lens CPU 110 proceeds to S603. At S603, the lens CPU 110 starts (turns ON) energization of the focus motor 108. The lens CPU 110 hereafter holds the energization ON state (that is, supplies the driving electric power in response to the focus drive instruction or performs the stop holding energization) until the supply of the source electric power to the interchangeable lens 100 is ended because of power-off of the camera 200 or the like.

This embodiment enables a proper energization management for the focus motor 108 according to whether the interchangeable lens 100 is responsive or non-responsive to the energization OFF instruction.

Moreover, each of the above-described embodiments causes the camera to manage the supply of the driving electric power to the interchangeable lens, and thereby enables suppression of the generation of the vibration sound from the motor, which achieves a high level of silence while reducing the power consumption in the interchangeable lens.

Although each of the above embodiments described the case of using the focus lens as the driven member, the driven member may be other members than the focus lens, such as the zoom lens, the aperture stop and the image stabilizing lens. Although each of the above embodiments described the case where the focus lens (driven member) is moved by the motor, alternative embodiments include a case where the driven member is not moved, but actuated.

Furthermore, the present invention is not limited to these embodiments and various variations and modifications may be made without departing from the scope of the present invention.

This application claims the benefit of Japanese Patent Application No. 2012-112147, filed on May 16, 2012, which is hereby incorporated by reference herein in its entirety.

What is claimed is:

1. An interchangeable lens detachably attachable to a camera, the interchangeable lens comprising:
   a lens communicator configured to perform communication with the camera;
   a motor to move or actuate a driven member included in the interchangeable lens; and
   a lens controller configured to stop supply of driving electric power to the motor or supply lower electric power than the driving electric power to the motor, in response to receipt, from the camera through the communication, of a drive stop instruction to stop the drive of the motor and a power saving instruction to save power.

2. An interchangeable lens according to claim 1, wherein the lens controller is configured to perform, when stopping the drive of the motor, a stop holding energization to supply a predetermined electric power equal to or lower than the driving electric power to the motor so as to hold the motor in a stopped state for a predetermined time period, and
   wherein the lens controller is configured to, when receiving the power saving instruction from the camera during the drive of the motor or during the stop holding energization, perform at least one of cutoff of electric power supply to the motor and supply of a lower electric power than the predetermined electric power to the motor after completion of the stop holding energization for the predetermined time period.

3. An interchangeable lens according to claim 1, wherein the lens controller is configured to determine whether a communication method to be used between the interchangeable lens and the camera is a synchronous communication method or an asynchronous communication method, and
   wherein the lens controller is configured to, when the communication method to be used between the interchangeable lens and the camera is the synchronous communication method, perform the stop of the driving electric power to the motor or supply the lower electric power than the driving electric power to the motor in response to the receipt of the drive stop instruction and the power saving instruction.

4. An interchangeable lens according to claim 1, wherein the lens controller is configured to determine whether the camera performs video capturing or still image capturing, and
   wherein the lens controller is configured to, when the camera performs the video capturing, perform the stop of the driving electric power to the motor or supply the lower electric power than the driving electric power to the motor in response to the receipt of the drive stop instruction and the power saving instruction.

5. A camera to which an interchangeable lens is detachably attachable, the camera comprising:
   a camera communicator configured to perform communication with the interchangeable lens; and
   a camera controller,
   wherein the interchangeable lens comprising: a lens communicator configured to perform communication with the camera; a motor to move or actuate a driven member included in the interchangeable lens; and a lens controller configured to stop, supply of driving electric power to the motor or supply lower electric power than the driving electric power to the motor, in response to receipt of a drive stop instruction to stop the drive of the motor and a power saving instruction to save power, and
   wherein the camera controller is configured to cause the lens controller to stop the supply of the driving electric power to the motor or supply the lower electric power than the driving electric power to the motor by sending, to the lens controller through the communication, the drive stop instruction and the power saving instruction.

6. A camera according to claim 5, wherein the camera controller is configured to determine whether the interchangeable lens is responsive to the power saving instruction or not, and
   wherein the camera controller is configured to, when the interchangeable lens is responsive to the power saving instruction, send the power saving instruction to the lens controller.

7. A method of controlling an interchangeable lens which is detachably attachable to a camera and comprises a motor to move or actuate a driven member, the method comprising:
   performing communication with the camera; and
   stopping supply of driving electric power to the motor or supplying lower electric power than the driving electric power to the motor, in response to receipt, from the camera through the communication, of a drive stop instruction to stop the drive of the motor and a power saving instruction to save power.

8. A method of controlling a camera to which an interchangeable lens comprising a motor to move or actuate a driven member included therein is detachably attachable, the method comprising:
   performing communication with the interchangeable lens; and
   causing the interchangeable lens to stop supply of driving electric power to the motor or supply lower electric power than the driving electric power to the motor by sending, to the interchangeable lens through the communication, a drive stop instruction to stop the drive of the motor and a power saving instruction to save power.

* * * * *